United States Patent
El-Ali et al.

(10) Patent No.: US 9,933,967 B1
(45) Date of Patent: Apr. 3, 2018

(54) METHOD AND APPARATUS FOR STORAGE MANAGEMENT USING VIRTUAL STORAGE ARRAYS AND VIRTUAL STORAGE POOLS

(71) Applicant: EMC IP Holding Company LLC, Hopkinton, MA (US)

(72) Inventors: Hala S. El-Ali, Murphy, TX (US); Michael G. Hegerich, Holliston, MA (US); Thomas L. Watson, Richardson, TX (US); Katakam Gangadhar, Bangalore (IN); Stalin Saravanakumar Thangapalam, Shrewsbury, MA (US); Anoop Ninan, Milford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/319,804

(22) Filed: Jun. 30, 2014

(51) Int. Cl.
   *G06F 12/02* (2006.01)
   *G06F 3/06* (2006.01)

(52) U.S. Cl.
   CPC .......... *G06F 3/0626* (2013.01); *G06F 3/0665* (2013.01); *G06F 3/0689* (2013.01)

(58) Field of Classification Search
   None
   See application file for complete search history.

(56) References Cited

U.S. PATENT DOCUMENTS

| | | | | |
|---|---|---|---|---|
| 7,945,640 B1 * | 5/2011 | VanTine | ................ | G06F 3/0605 709/217 |
| 8,060,630 B1 * | 11/2011 | Jancaitis | ............... | H04L 49/356 709/223 |
| 8,682,955 B1 * | 3/2014 | Monden | ................. | G06Q 10/06 709/201 |
| 2002/0103913 A1 * | 8/2002 | Tawil | .................... | G06F 13/387 709/229 |
| 2002/0188697 A1 * | 12/2002 | O'Connor | ............. | G06F 3/0614 709/219 |
| 2006/0036736 A1 * | 2/2006 | Kitamura | ............ | H04L 41/0813 709/226 |
| 2009/0254468 A1 * | 10/2009 | Acedo | ................... | G06F 3/0605 705/35 |

* cited by examiner

*Primary Examiner* — Duc Doan
(74) *Attorney, Agent, or Firm* — Daly, Crowley Mofford & Durkee, LLP

(57) ABSTRACT

Example embodiments of the present invention relate to a method, a system, and a computer program product for aggregating physical storage pools and ports into a virtual storage array. The method includes selecting a plurality of physical storage pools in a storage environment, selecting a plurality of ports in the storage environment, and aggregating the physical storage pools and ports into a virtual storage array. Example embodiments of the present invention relate to a method, a system, and a computer program product for aggregating a plurality of storage resource from a plurality of physical storage pools into a virtual storage pool. The method includes selecting a plurality of storage resource from a plurality of physical storage pools and aggregating the plurality of resources from the plurality of physical storage pools into a virtual storage pool.

24 Claims, 21 Drawing Sheets

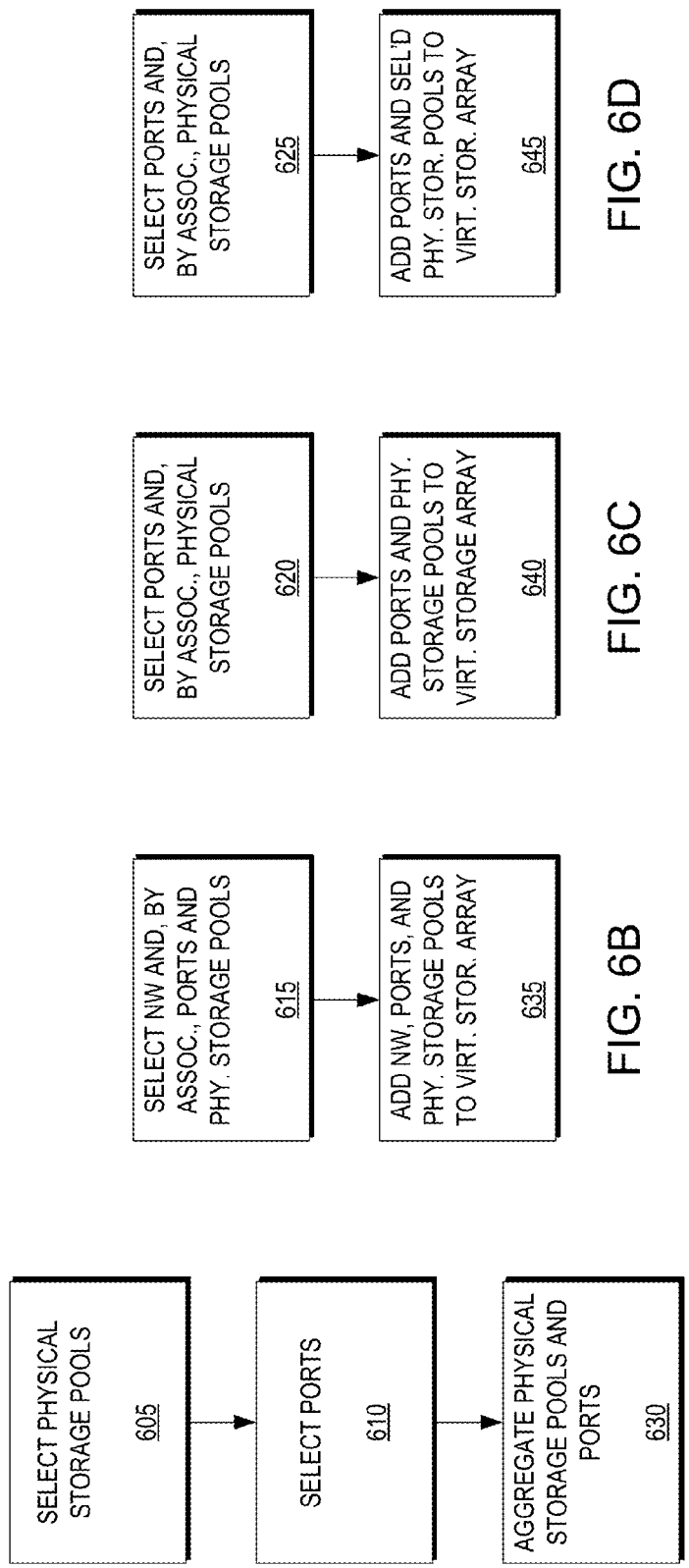

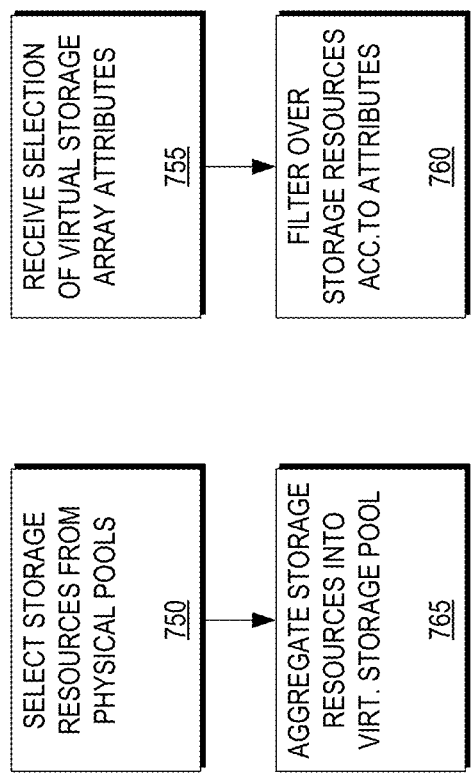

Virtual Arrays

| | Name ▲ | Host ◆ | Type ◆ | Status ◆ | Registered ◆ | Edit |
|---|---|---|---|---|---|---|
| ☐ | ⌄ SYMMETRIX+000195701573 — 815A | 10.247.99.71 | EMC VMAX | ☑ | ✓ | Pools \| Ports |
| | Version 5876.251.161 | | | | | |
| | Storage Provider smis-vmax-505 | | | | | |
| | Data Protection Connectivity Types SRDF (000195701505) | | | | | |
| | Last Discovery 53 minutes ago | | | | | |
| | Discovery Status Completed — 815B | | | | | |
| ☐ | ⌄ SYMMETRIX+000195701505 | 10.247.99.72 | EMC VMAX | ☑ | ✓ | Pools |
| | Version 5876.249.161 | | | | | |
| | Storage Provider smis-vmax-505 | | | | | |
| | Data Protection Connectivity Types SRDF (000195701573) | | | | | |
| | Last Discovery 54 minutes ago | | | | | |
| | Discovery Status Completed | | | | | |

First ← 1 2 → Last   [+ Add] [🗑 Delete] [⟲ Rediscovery] [+ Register] [+ Deregister]

Showing 1 to 2 of 2 entries

FIG. 8

Add Storage System — 1000

| Name | Type | Status |
|---|---|---|
| ☐ CLARIION+APM00121500018 | EMC VNX Block | ☑ |
| ☐ SYMMETRIX+000195701351 | EMC VMAX | ☑ |
| ☐ SYMMETRIX+000198700406 | EMC VMAX | ☑ |

1010 / 1015₁–1015₃ / 1020 / 1030

First ← 1 2 → Last     Showing 1 to 1 of 1 entries

[+ Add] [× Cancel]

Add Networks — 1110A

| Name | Registered | Type — 1120A | Status |
|---|---|---|---|
| FABRIC_Brocade A BE | ✓ | FiberChannel | ✓ |
| FABRIC_Brocade A FE | ✓ | FiberChannel | ✓ |
| FABRIC_Brocade B BE | ✓ | FiberChannel | ✓ |
| FABRIC_Brocade B FE | ✓ | FiberChannel | ✓ |
| FABRIC_fake array fabric | | FiberChannel | |
| FABRIC_losam060 Don't use | ✓ | FiberChannel | ✓ |
| FABRIC_losam070 Don't use | ✓ | FiberChannel | ✓ |
| FABRIC_vplex154nbr2 | | FiberChannel | |

First ← 1 2 → Last

Showing 1 to 8 of 13 entries

[+ Add] [× Cancel]

FIG. 11B — 1100B

Add Storage Ports — 1110B

| Name | Group | Storage System — 1120B | Identifier — 1130B | Type — 1140B | Status — 1150B |
|---|---|---|---|---|---|
| SP_B:10 | SP_B | CLARiiON+APM00121500018 | iqn.1992-04.com.emc:cx.apm00121500018.b10 | IP | ☑ |
| SP_A:4 | SP_A | CLARiiON+APM00121500018 | 50:06:01:64:3E:A0:59:B0 | FC | ☑ |
| SP_A:10 | SP_A | CLARiiON+APM00121500018 | iqn.1992-04.com.emc:cx.apm00121500018.a10 | IP | ☑ |
| SP_A:1 | SP_A | CLARiiON+APM00121500018 | 50:06:01:61:3E:A0:59:B0 | FC | ☑ |
| SP_B:0 | SP_B | CLARiiON+APM00121500018 | 50:06:01:68:3E:A0:59:B0 | FC | ☑ |
| SP_B:7 | SP_B | CLARiiON+APM00121500018 | 50:06:01:6F:3E:A0:59:B0 | FC | ☑ |
| SP_A:7 | SP_A | CLARiiON+APM00121500018 | 50:06:01:67:3E:A0:59:B0 | FC | ☑ |
| SP_B:9 | SP_B | CLARiiON+APM00121500018 | iqn.1992-04.com.emc:cx.apm00121500018.b19 | IP | ☑ |

First ← 1 2 3 4 5 → Last

Showing 1 to 8 of 58 entries

[+ Add] [× Cancel]

| Add Storage Pools 1110C | | 1120C | 1130C | 1140C | 1150C Search.. | 1160C |
|---|---|---|---|---|---|---|
| ☐ | Name ⬥ | Storage System ⬥ | Provisioning ⬥ | Drive Types ⬥ | Free ⬥ | Total ⬥ |
| ☐ | 0000 | CLARiiON+APM00121500018 | Thick | SAS | 457 GB | 534 GB |
| ☐ | 0001 | SYMMETRIX+000195701351 | Thick | SATA | 12559 GB | 28490 GB |
| ☐ | 0001 | CLARiiON+APM00121500018 | Thick | SAS | 2139 GB | 2141 GB |
| ☐ | 0002 | CLARiiON+APM00121500018 | Thick | SAS | 629 GB | 1070 GB |
| ☐ | 0002 | SYMMETRIX+000195701351 | Thick | FC | 8395 GB | 20712 GB |
| ☐ | 0003 | SYMMETRIX+000195701351 | Thick | FC | 10016 GB | 10901 GB |
| ☐ | 0004 | SYMMETRIX+000195701351 | Thick | FC | 3621 GB | 3815 GB |
| ☐ | 0005 | SYMMETRIX+000195701351 | Thick | FC | 1471 GB | 1635 GB |

1115C₁–1115Cₙ

First ← 1 2 3 4 5 → Last         Showing 1 to 8 of 36 entries

[+ Add]  [× Cancel]

EMC ViPR

> Hardware

⌂ Create Block Virtual Pool

Enter the information needed to create Block Virtual Pool.

| | |
|---|---|
| Name: | DR Pool • ← 1405 |
| Description: | Pool for DR Storage for Boston production storage • ← 1410 |
| Virtual Arrays: | ☐ Boston  ☑ New York • ← 1415 |

A Virtual Pool must be associated with one or more Virtual Arrays before the options for other available criteria can be determined.

Enable Quota: ☐

▼ ▓ Hardware

| | |
|---|---|
| Provisioning Type: | Thin ▼ • |
| Auto-Bering Policy: | None ▼ |
| Multi-Volume Consistency: | ○ |
| Drive Type: | None ▼ |
| System Type: | EMC VMAX ▼ ← 1420 |
| RAID Level(s): | ☐ RAID1  ☐ RAID5  ☐ RAID6 |
| Thin Volume Preallocation: | ____ % |
| Unique Auto-Bering Policy Names: | ☐ Check to show unique policy names in Auto-Bering Policy |
| Auto-Bering Policy: | None ▼ |
| Multi-Volume Consistency: | ☐ |

> ✕ SAN Multi Path
> ⊘ High Availability
> ● Data Protection
> 🔒 Access Control
> ▓ Storage Pools ⑱

FROM FIG. 14-I

1425 — Pool Assignment: Automatic ▼
                                Automatic
                                Manual

| Name | Storage System | Provisioning | Drive Types | Free | Subscribed | Total |
|---|---|---|---|---|---|---|
| ☐ 573-R5-FC-2 | SYMMETRIX+000195701573 | Thin | FC | 498 GB | 891 GB | 500 GB |
| ☐ KateMoss | SYMMETRIX+000195701573 | Thin | SATA | 1634 GB | 3578 GB | 2020 GB |
| ☐ test-srdf | SYMMETRIX+000195701573 | Thin | SATA | 98 GB | 306 GB | 100 GB |
| ☐ test-srdf-1 | SYMMETRIX+000195701505 | Thin | FC | 99 GB | 304 GB | 100 GB |
| ☐ test-srdf-2 | SYMMETRIX+000195701505 | Thin | FC | 9 GB | 31 GB | 10 GB |
| ☐ test-srdf-3 | SYMMETRIX+000195701573 | Thin | FC | 197 GB | 785 GB | 500 GB |
| ☐ test-srdf-4 | SYMMETRIX+000195701573 | Thin | SATA | 258 GB | 1239 GB | 560 GB |
| ☐ test-srdf-4 | SYMMETRIX+000195701505 | Thin | FC | 9 GB | 30 GB | 10 GB |
| ☐ test-srdf-5 | SYMMETRIX+000195701505 | Thin | FC | 19 GB | 81 GB | 20 GB |
| ☐ test-srdf-6 | SYMMETRIX+000195701505 | Thin | FC | 19 GB | 70 GB | 20 GB |
| ☐ test-srdf-7 | SYMMETRIX+000195701573 | Thin | FC | 99 GB | 304 GB | 100 GB |
| ☐ testPool | SYMMETRIX+000195701505 | Thin | SATA | 1 GB | 1 GB | 1 GB |
| ☐ test-srdf-1 | SYMMETRIX+000195701505 | Thin | SATA | 19 GB | 80 GB | 20 GB |
| ☐ TP-RD5-FC | SYMMETRIX+000195701573 | Thin | FC | 1997 GB | 408 GB | 1999 GB |
| ☑ TP-RD6-FC | SYMMETRIX+000195701505 | Thin | FC | 1999 GB | 1225 GB | 1999 GB |
| ☑ TP-RD8-FC | SYMMETRIX+000195701505 | Thin | FC | 998 GB | 327 GB | 999 GB |
| ☑ TP-RD5-FC | SYMMETRIX+000195701505 | Thin | SATA | 999GB | 408 GB | 1999 GB |
| ☑ TP-RD5-FC | SYMMETRIX+000195701505 | Thin | SATA | 999GB | 18 GB | 1999 GB |

Showing 1 to 18 of 18 entries

↺ Save   🗑 Cancel

FIG. 14-II

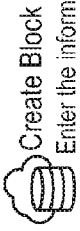
FIG. 15-I

FROM FIG. 15-I

Maximum Snapshots: [         ]
   Minimum number of local snapshots allowed for resources from this Virtual Pool
Maximum Continuous Copies: [         ]
   Maximum number of native continuous copies allowed for resources from this Virtual Pool
Continuous Copies Virtual Pool: [None ▼]
Optionally select a different Virtual Pool to use for continuous copies (applicable only if maximum copies > 0)
Protection System: [VMAX SRDF ▼] ⟵ 1530
   Specifies storage that is protected by the selected data protection type
SRDF Copy Mode: [Synchronous ▼] ⟵ 1535
SRDF Copies:
   | Virtual Array | Virtual Pool |
   | New York      | DR Pool      |
                     Add Copy      ⟵ 1540

Configure target Virtual Arrays and optional target Virtual Pools for SRDF copies > ⚿ Access Control
> ▦ Storage Pools ○

1550 ⟶ Pool Assignment: [Automatic ▼]
Choosing manual pool assignment shows selection of a subset of the storage pools matching he criteria

| Name ▲ | Storage System ◆ | Provisioning ◆ | Drive Types ◆ | Free ◆ | Subscribed ◆ | Total ◆ |
|---|---|---|---|---|---|---|
| ☐ 573-R5-FC-2 | SYMMETRIX+000195701573 | Thin | FC | 498 GB | 891 GB | 500 GB |
| ☐ KateMoss | SYMMETRIX+000195701573 | Thin | SATA | 1634 GB | 3578 GB | 2020 GB |
| ☐ test-srdf | SYMMETRIX+000195701573 | Thin | SATA | 98 GB | 306 GB | 100 GB |
| ☐ test-srdf-5 | SYMMETRIX+000195701505 | Thin | FC | 197 GB | 785 GB | 500 GB |
| ☑ test-srdf-4 | SYMMETRIX+000195701505 | Thin | SATA | 258 GB | 1239 GB | 560 GB |
| ☐ test-srdf-1 | SYMMETRIX+000195701573 | Thin | SATA | 19 GB | 60 GB | 20 GB |

1565  1575  1580  1585  1590  1595

Showing 1 to 6 of 6 entries

[↻ Save] [✕ Cancel]
1570   1545

FIG. 15-II

METHOD AND APPARATUS FOR STORAGE MANAGEMENT USING VIRTUAL STORAGE ARRAYS AND VIRTUAL STORAGE POOLS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", Ser. No. 13/631,214 entitled "AUTOMATED POLICY BASED SCHEDULING AND PLACEMENT OF STORAGE RESOURCES", and Ser. No. 13/631,246 entitled "DISTRIBUTED SYSTEM SOFTWARE INFRASTRUCTURE" filed on Sep. 28, 2012; Ser. No. 13/886,644 entitled "STORAGE PROVISIONING IN A DATA STORAGE ENVIRONMENT", Ser. No. 13/886,786 entitled "DISTRIBUTED WORKFLOW MANAGER", Ser. No. 13/886,789 entitled "PORT PROVISIONING SYSTEM", Ser. No. 13/886,892 entitled "SCALABLE INDEX STORE", Ser. No. 13/886,687 entitled "STORAGE PROVISIONING IN A DATA STORAGE ENVIRONMENT", and Ser. No. 13/886,915 entitled "SCALABLE OBJECT STORE" filed on May 3, 2013; and Ser. No. 14/319,757 entitled "METHOD AND APPARATUS FOR AUTOMATED MULTI SITE PROTECTION AND RECOVERY FOR CLOUD STORAGE", Ser. No. 14/315,438 entitled "GLOBAL STORAGE RESOURCE MANAGEMENT", Ser. No. 14/319,772 entitled "METHOD AND APPARATUS FOR AUTOMATED ORCHESTRATION OF LONG DISTANCE PROTECTION OF VIRTUALIZED STORAGE", Ser. No. 14/319,777 entitled "METHOD AND APPARATUS FOR HIGHLY AVAILABLE STORAGE MANAGEMENT USING STORAGE PROVIDERS", Ser. No. 14/319,797 entitled "METHOD AND APPARATUS FOR AUTOMATED SELECTION OF A STORAGE GROUP FOR STORAGE TIERING", and Ser. No. 14/313,104 entitled "STORAGE PORT ALLOCATION BASED ON INITIATOR USAGE" filed on even date herewith, which are hereby incorporated herein by reference in their entirety.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available. Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method, a system, and a computer program product for aggregating physical storage pools and ports into a virtual storage array. The method includes selecting a plurality of physical storage pools in a storage environment, selecting a plurality of ports in the storage environment, and aggregating the physical storage pools and ports into a virtual storage array. Example embodiments of the present invention relate to a method, a system, and a computer program product for aggregating a plurality of storage resource from a plurality of physical storage pools into a virtual storage pool. The method includes selecting a plurality of storage resource from a plurality of physical storage pools and aggregating the plurality of resources from the plurality of physical storage pools into a virtual storage pool.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 6A-6D are flow diagrams illustrating methods for aggregating physical storage pools and ports into a virtual storage array according to respective example embodiments of the present invention;

FIGS. 7A-7B are flow diagrams illustrating methods for aggregating storage resources from physical storage pools into a virtual storage pool according to respective example embodiments of the present invention;

FIG. 8 is a screen shot of a graphical user interface illustrating a plurality of storage systems according to an example embodiment of the present invention;

FIG. 10 is a screen shot of a graphical user interface for adding a storage system to a virtual storage array according to an example embodiment of the present invention;

FIGS. 11A-11C are screen shots of respective graphical user interfaces for adding networks, storage ports, and storage pools according to example embodiments of the present invention;

FIG. 13 is a screen shot of a graphical user interface illustrating a plurality of virtual storage arrays according to an example embodiment of the present invention;

FIG. 14 is a screen shot of a graphical user interface for creating a virtual storage pool according to an example embodiment of the present invention;

FIG. 15 is a screen shot of a graphical user interface for creating a virtual storage pool for provisioning requests that require data protection according to an example embodiment of the present invention;

DETAILED DESCRIPTION

Figure 1:
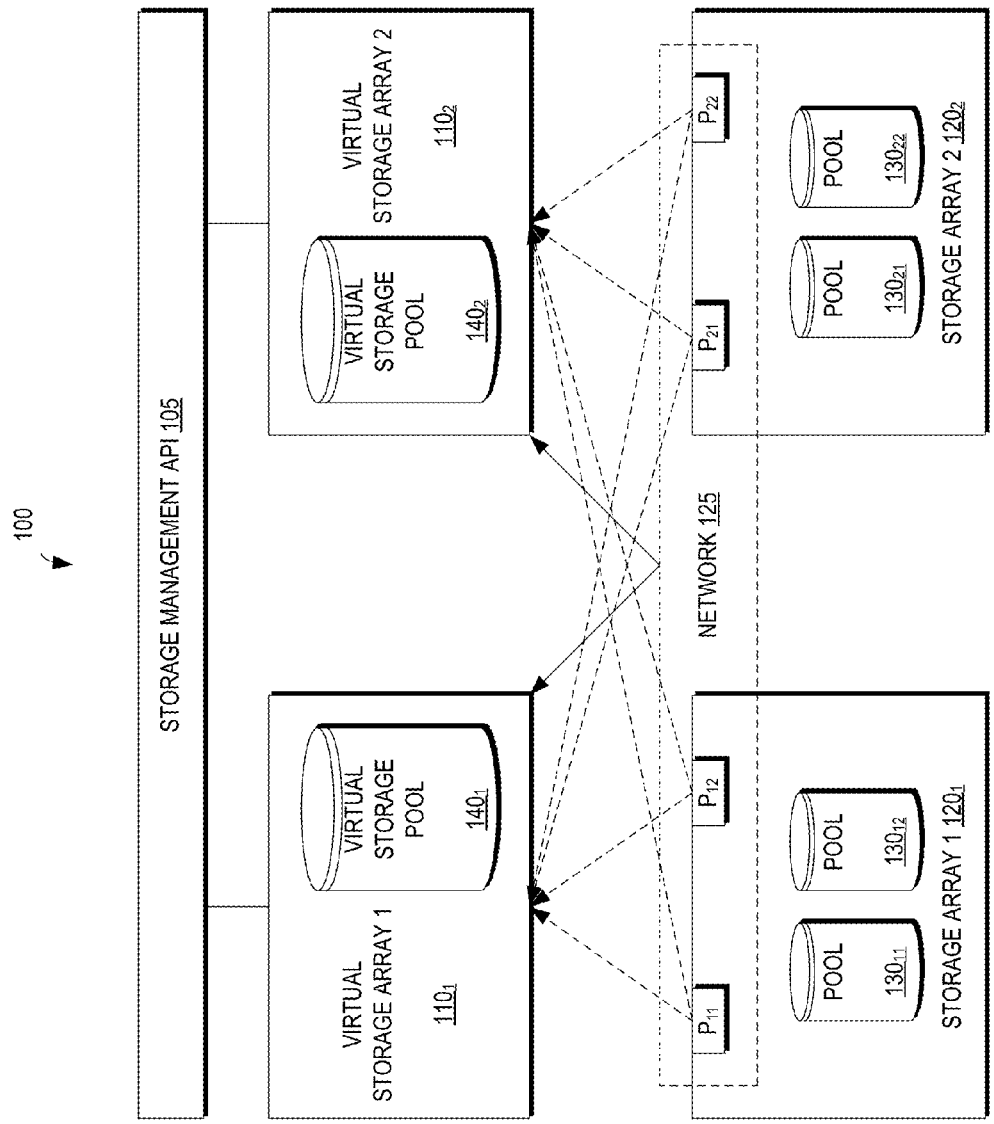
FIG. 1 is a block diagram of a storage environment including two virtual storage arrays aggregated from a plurality of physical storage pools and ports in the storage environment and two virtual storage pools aggregated from a plurality of storage resource from the plurality of physical storage pools according to an example embodiment of the present invention.

As datacenters grow in terms of storage, network, compute, etc., users need to plan to effectively utilize their environment based on how it is used and what purposes the environment serves. The traditional approach is to monitor and manage elements on a per-device basis. However, this typically does not necessarily align with business goals.

Example embodiments of the present invention overcome these and other deficiencies by providing two fundamental abstractions called virtual storage arrays and virtual storage pools which enable users to carve up or mold physical infrastructures into virtualized containers that may be mapped directly to business needs. Example embodiments of the present invention allow a user to see existing hardware resources as a pool across multiple storage arrays and to define existing physical resource and partition them according to need without being limited by borders of physical array. To do this, example embodiments of the present invention provide two new constructs: virtual storage arrays and virtual storage pools.

A virtual storage array allows a user to specify criteria (e.g., physical location of storage or other attributes, functionality (e.g., testing, development, production, different purposes)) to provide virtualization of a storage array. In other words, a virtual storage array allows a user to bring physical storage arrays or portions of physical storage arrays together to act as a virtual physical storage array.

A virtual storage pool virtualizes the concept of a storage pool by allowing a user to define attributes (e.g., FAST policy, type of storage, backup, protection, other attributes) and the system then goes out to existing physical storage pools and groups them together as a virtual storage pool. In other words, a virtual storage pool brings physical storage pools with similar characteristics from different arrays to single virtual storage pool and treats it almost as with a physical storage pool on a storage array.

A user may define a virtual storage array by selecting networks and/or ports that will be used for connectivity. Accordingly, virtual storage arrays contain, by association, physical storage pools. When a virtual storage array is associated either by network or by explicit assignment of ports on a physical storage array to a virtual storage array, then the physical storage pools get associated by default. Just like physical ports can be individually assigned to virtual storage arrays, physical storage pools can be individually assigned to virtual storage arrays.

The virtual storage pool forms a logical grouping of backend storage systems. In certain embodiments, the desired virtual storage pool for certain data can be specified by a storage administrator. In certain embodiments, the data is stored only on the devices that are associated with the virtual storage pool. In certain embodiments, if multiple devices are associated with the virtual storage pool, the data can be spread across all the devices.

Virtual storage pools logically form disjoint sets in which the data set is divided. The key space within each virtual storage pool may be divided into partitions with the partitioning performed based on the consistent hashing. The partition identifiers may be scoped within the virtual storage pool so each of virtual storage pool can have same partition identifiers.

FIG. 1 is a block diagram of a storage environment 100 (e.g., a virtual datacenter) including two virtual storage arrays $110_1$, $110_2$ (110 generally) aggregated from a plurality of physical storage pools and ports according to an example embodiment of the present invention. FIG. 1 may be described in conjunction with FIGS. 6A-6D which are flow diagrams illustrating methods for aggregating physical storage pools and ports into a virtual storage array according to respective example embodiments of the present invention.

As illustrated in FIG. 1, the virtual storage arrays 110 simplify storage management of datacenters, pods, or islands of storage and are aggregated by a storage management API 105 from physical storage pools 130₁₁, 130₁₂ on a first storage array 120₁ and physical storage pools 130₂₁, 130₂₂ on a second storage array 120₂. Each storage array 120₁, 120₂ (120 generally) also has a plurality of respective ports, with the first storage array 120₁ having two ports $P_{11}$, $P_{12}$ and the second storage array 120₂ having two ports $P_{21}$, $P_{22}$ (P generally). The ports may be part of a network 125, such as a storage area network (SAN). As will be described in greater detail below, the network 125 and its individual ports P may be associated with one or more of the virtual storage arrays 110.

Generally, a SAN includes one or more devices, referred to as "nodes" (not shown). A node in a SAN may be an "initiator" or a "target", or both. An initiator node is a device that is able to initiate requests to one or more other devices; and a target node is a device that is able to reply to requests, such as Small Computer System Interface (SCSI) commands, sent by an initiator node. A SAN may also include network switches (not shown), such as fiber channel switches. The communication links between each host computer and its corresponding storage system may be any appropriate medium suitable for data transfer, such as fiber communication channel links. In an embodiment of the present invention, the host communicates with its corresponding storage system using SCSI commands. It should be understood, however, that example embodiments of the present invention apply to any storage type (e.g., block, file, and object) and to any type of data transfer (e.g., FC, iSCSI, IP, and proprietary).

Each storage array 120 includes physical storage units for storing data, such as disks or arrays of disks. Typically, storage arrays 120 are target nodes. In order to enable initiators to send requests to a storage array 120, the storage array 120 exposes one or more logical units (LUs) to which commands are issued. A logical unit is a logical entity provided by a storage array 120 for accessing data stored in the storage array 120. A logical unit is identified by a unique logical unit number (LUN). Thus, as illustrated in the example embodiment of FIG. 1, the storage arrays 120 are SAN entities that provide multiple LUs for access by multiple SAN initiators.

According to example embodiments of the present invention, as illustrated in FIGS. 1 and 6A, a virtual storage array may be created by selecting a plurality of physical storage pools 130 in a storage environment 100 (605) and selecting a plurality of ports P in the storage environment 100 (610). The storage environment 100 may comprise a plurality of physical storage arrays 120 with each physical storage array 120 having a plurality of physical storage pools 130. The physical storage pools 130 and the ports P then may be aggregated into a virtual storage array 110 (630). Each physical storage pool 130 may comprise a set of pools of storage on physical storage arrays 120 that each may exist in one or more networks 125. The plurality of ports may exist in one or more networks. Accordingly, aggregating a first physical storage pool from a first network and a second physical storage pool from a second network may create a virtual storage array in one or more networks. It should be understood that each of the physical storage pools and ports may be aggregated into a plurality of virtual storage arrays.

In certain embodiments, as illustrated in FIG. 6B, ports may be selected by selecting a network in its entirety (615), thereby encompassing all ports by association (and the physical storage pools available thereover). The physical storage pools and ports then may be aggregated into a virtual storage array by adding the network to the virtual storage array (635), thereby implicitly adding the physical storage pools and ports comprising the network to the virtual storage array.

In other embodiments, as illustrated in FIG. 6C, ports may be selected by selecting individual ports in one or more networks (620), thereby capturing the physical storage pools available thereover. The physical storage pools and ports then may be aggregated into a virtual storage array by adding the ports to the virtual storage array (640), thereby implicitly adding the physical storage pools to the virtual storage array.

In yet other embodiments, as illustrated in FIG. 6D, ports may be selected by selecting individual ports in one or more networks (625), thereby capturing the physical storage pools available thereover. Particular physical storage pools of the plurality of physical storage pools available over the selected ports may be selected for inclusion in the virtual storage array. The physical storage ports and selected physical storage pools then may be aggregated into a virtual storage array by adding them to the virtual storage array (645).

As illustrated in FIG. 1, the network 125 is explicitly associated with each virtual storage array 110 (as indicated by the solid arrows from the network 125 to each virtual storage array 110₁, 110₂). Accordingly and by virtue of their residence in the network 125, each of the ports $P_{11}$, $P_{12}$, $P_{21}$, $P_{22}$ is implicitly associated with each virtual storage array 110 (as indicated by the dotted arrows from each port $P_{11}$, $P_{12}$, $P_{21}$, $P_{22}$ to each virtual storage array 110₁, 110₂).

Figure 2:
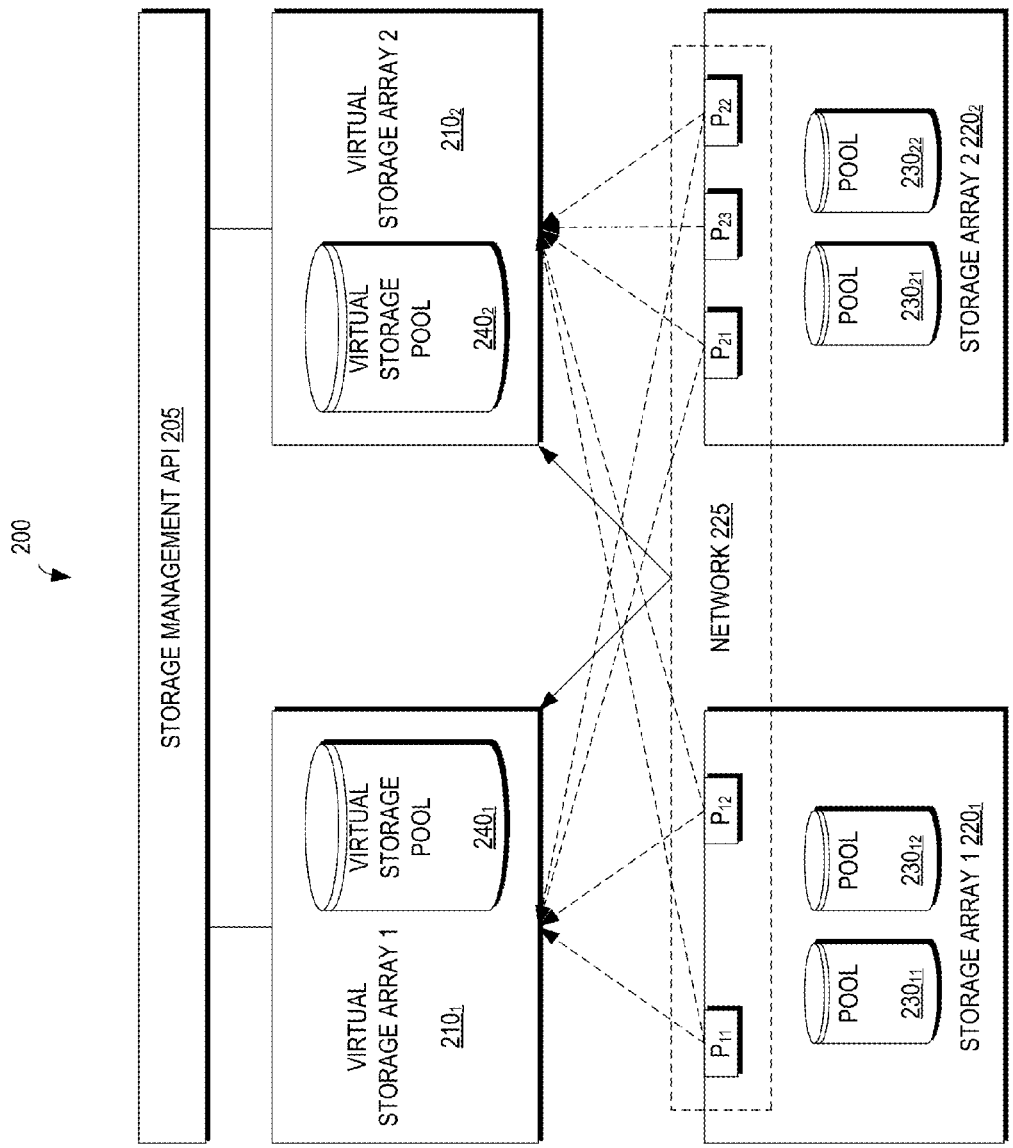
FIG. 2 is a block diagram of a storage environment including two virtual storage arrays having two respective virtual storage pools and a newly discovered port according to an example embodiment of the present invention.

FIG. 2 is a block diagram of a storage environment 200 including two virtual storage arrays 210₁, 210₂ (210 generally) having two respective virtual storage pools 240₁, 240₂ representing types of storage services available (e.g., TIER-1: FAST VP with replication) and a newly discovered port $P_{23}$ on the second storage array 220₂ according to an example embodiment of the present invention. As illustrated in FIG. 2, when a new port $P_{23}$ in a network 225 associated with the virtual storage arrays 210 is added or otherwise discovered on one of the storage arrays 220, the port $P_{23}$ is added dynamically and to the virtual storage arrays 210. Here, port $P_{23}$ in the network 225 is added to the second storage array 220 and is implicitly added to both the first virtual storage arrays 210₁ and the second virtual storage array 210₂ by virtue of the network 225 being associated explicitly with each virtual storage array 210₁, 210₂.

Figure 3:
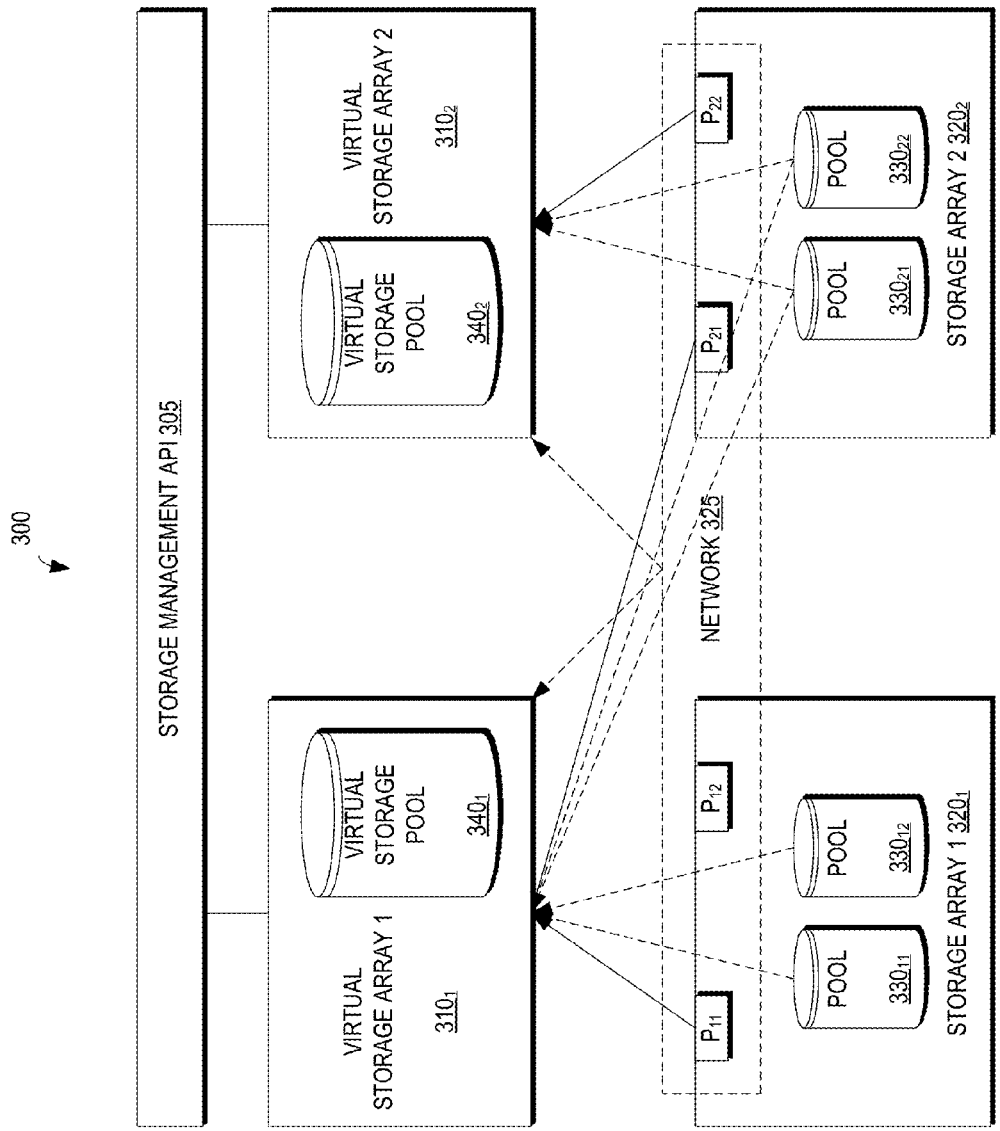
FIG. 3 is a block diagram of a storage environment including two virtual storage arrays having two respective virtual storage pools and implicit association with the virtual storage arrays of physical storage pools accessible via the ports according to an example embodiment of the present invention.

FIG. 3 is a block diagram of a storage environment 300 including two virtual storage arrays 310₁, 310₂ (310 generally) having two respective virtual storage pools 340₁, 340₂ and implicit association with the virtual storage arrays 310 of physical storage pools 330₁₁, 330₁₂, 330₂₁, 330₂₂ accessible via the ports $P_{11}$, $P_{21}$, $P_{22}$ according to an example embodiment of the present invention. As illustrated in FIG. 3, port $P_{11}$ from the first storage array 320₁ and port $P_{21}$ from the second storage array 320₂ are explicitly associated with the first virtual storage array 310₁ and port $P_{22}$ from the second storage array 320₂ is explicitly associated with the second virtual storage array 310₂ (as indicated by the solid arrows from the ports $P_{11}$, $P_{21}$, $P_{22}$ to the respective virtual storage arrays 310).

Accordingly, and by virtue of the association of the following ports with the first virtual storage array 310₁, the two physical storage pools 330₁₁, 330₁₂ of the first storage array 320₁ accessible via port $P_{11}$ of the first storage array 320₁ and the two physical storage pools 330₂₁, 330₂₂ of the second storage array 320₂ accessible via port $P_{21}$ of the second storage array 320₂ are implicitly associated with the first virtual storage array 310₁. Likewise, and by virtue of the association of the following ports with the second virtual storage array $310_2$, the two physical storage pools $330_{21}$, $330_{22}$ of the second storage array $320_2$ accessible via port $P_{22}$ of the second storage array $320_2$ are implicitly associated with the second virtual storage array $310_2$.

Figure 4:
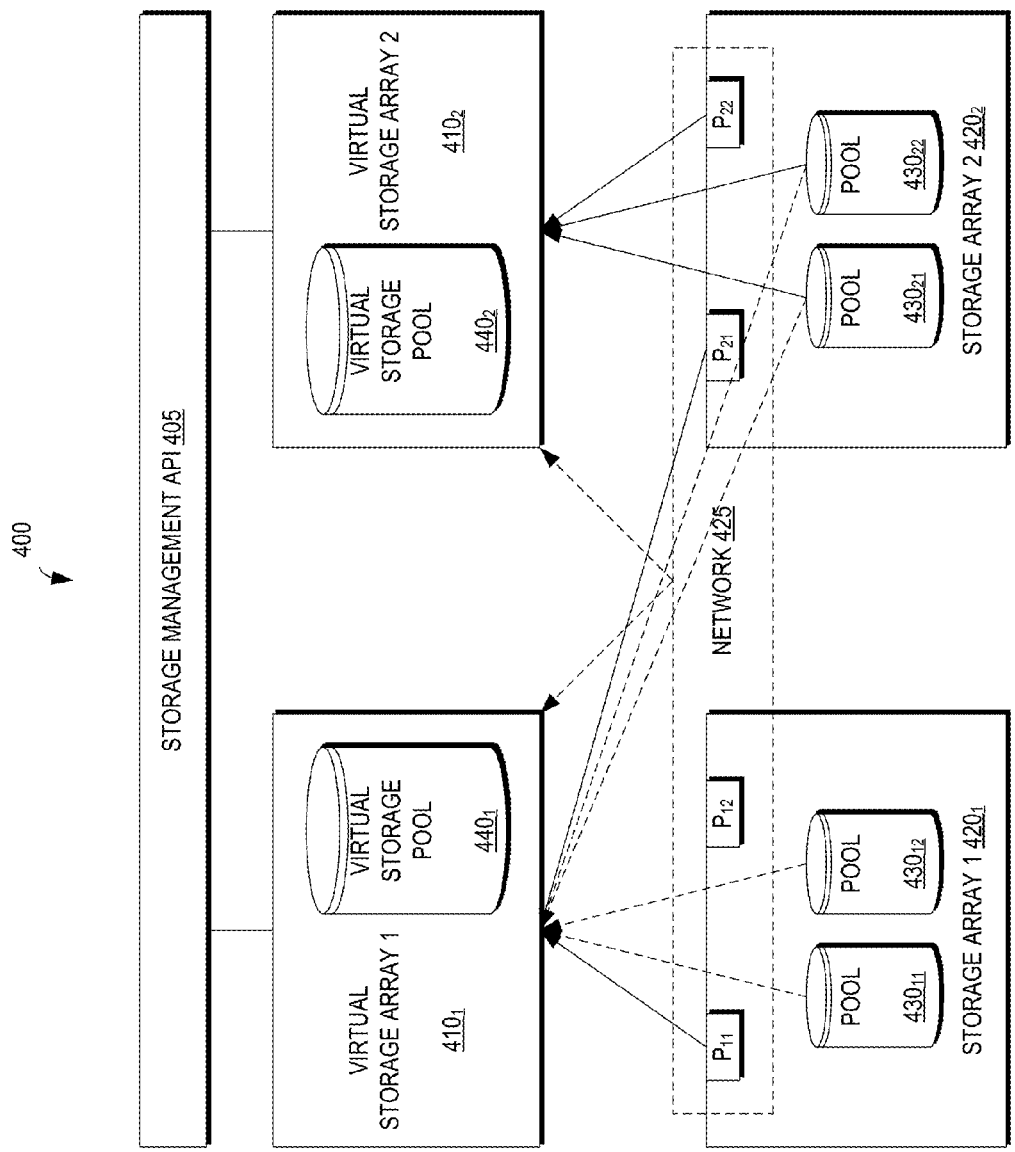
FIG. 4 is a block diagram of a storage environment including two virtual storage arrays having two respective virtual storage pools and explicit association with the virtual storage arrays of physical storage pools accessible via the ports according to an example embodiment of the present invention.

FIG. 4 is a block diagram of a storage environment 400 including two virtual storage arrays $410_1$, $410_2$ (410 generally) having two respective virtual storage pools $440_1$, $440_2$ and implicit association with the virtual storage arrays 410 of physical storage pools $430_{11}$, $430_{12}$, $430_{21}$, $430_{22}$ accessible via the ports $P_{11}$, $P_{21}$, $P_{22}$ according to an example embodiment of the present invention. As illustrated in FIG. 4, similar to FIG. 3, the two physical storage pools $430_{11}$, $430_{12}$ of the first storage array $420_1$ and the two physical storage pools $430_{21}$, $430_{22}$ of the second storage array $420_2$ are implicitly associated with the first virtual storage array $410_1$ by virtue of the explicit association of their respective ports $P_{11}$, $P_{21}$ with the first virtual storage array $410_1$ (as indicated by the solid arrows from the ports $P_{11}$, $P_{21}$, $P_{22}$ to the respective virtual storage arrays 410). However, in contrast to FIG. 3, the two physical storage pools $430_{21}$, $430_{22}$ of the second storage array $420_2$ are explicitly associated with the second virtual storage array $410_2$ (as indicated by the solid arrows from the physical storage pools $430_{21}$, $430_{22}$ to the virtual storage array $410_2$), thereby overriding any implicit association of the two physical storage pools $430_{21}$, $430_{22}$ of the second storage array $420_2$ by virtue of the explicit association of port $P_{22}$ with the second virtual storage array $410_2$.

Figure 5:
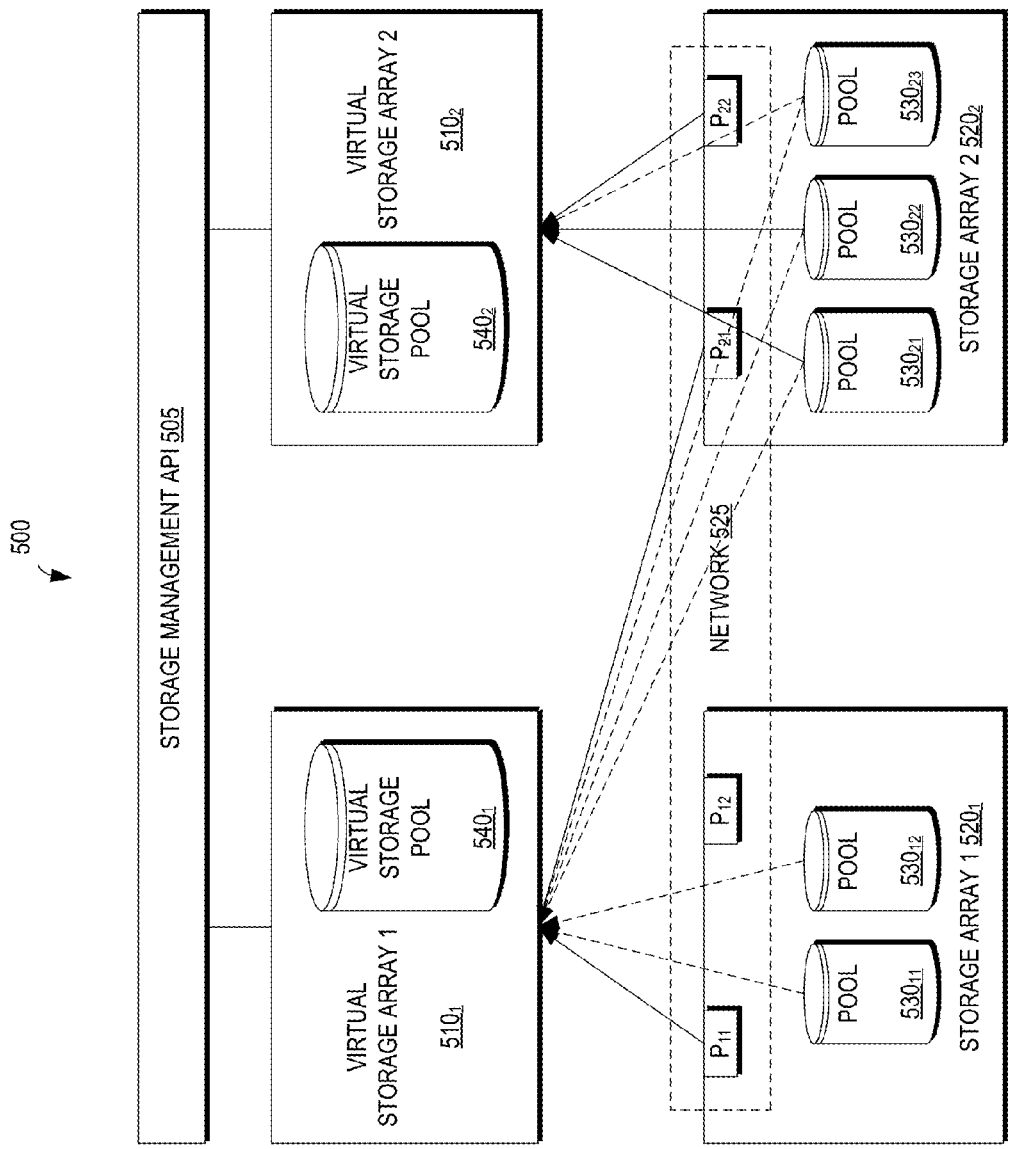
FIG. 5 is a block diagram of a storage environment including two virtual storage arrays having two respective virtual storage pools and implicit association with the virtual storage arrays of a newly discovered physical storage pool accessible via the ports according to an example embodiment of the present invention.

FIG. 5 is a block diagram of a storage environment 500 including two virtual storage arrays $510_1$, $510_2$ (510 generally) having two respective virtual storage pools $540_1$, $540_2$ and implicit association with the virtual storage arrays 510 of a newly discovered physical storage pool $530_{23}$ accessible via the ports $P_{21}$, $P_{22}$ according to an example embodiment of the present invention. As illustrated in FIG. 5, ports $P_{21}$, $P_{22}$ are explicitly associated with for the first virtual storage array $510_1$ and the second virtual storage array $510_2$. Upon discovery of the newly discovered physical storage pool $530_{23}$, and by virtue of it being accessible in the second storage array $520_2$ via ports $P_{21}$, $P_{22}$, the newly discovered physical storage pool $530_{23}$ is implicitly associated with both the first virtual storage array $510_1$ and the second virtual storage array $510_2$. Specifically, the newly discovered physical storage pools $530_{23}$ is implicitly associated with the first virtual storage array $510_1$ by virtue of port $P_{21}$ being explicitly associated with the first virtual storage array $510_1$ and is implicitly associated with the second virtual storage array $510_2$ by virtue of port $P_{22}$ being explicitly associated with the second virtual storage array $510_2$.

FIG. 8 is a screen shot of a graphical user interface (GUI) 800 illustrating a plurality of storage systems according to an example embodiment of the present invention. As illustrated in FIG. 8, there are two storage systems available: SYMMETRIX+000195701573 815A and SYMMETRIX+000195701505 815B (815 generally). As illustrated in FIG. 8, each storage system 815 may have a plurality of attributes, including its version, the identity of the storage provider managing the storage system, types of data protection available for the storage system (e.g., SRDF), the time the storage system was last discovered by the storage management API, and the status of that discovery. Further, as illustrated in FIG. 8, the GUI 800 may provide information regarding the storage systems 815, such as storage system name 810, the host 820, the storage system type 830 (e.g., VMAX), the storage system status 840 (e.g., available, failure), whether the storage system is registered 850 with the storage management API, and the ability to view/edit 860 the pools and ports comprising the storage system.

Figure 9:
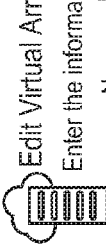
FIG. 9 is a screen shot of a graphical user interface for creating a virtual storage array according to an example embodiment of the present invention.

FIG. 9 is a screen shot of a graphical user interface (GUI) 900 for creating a virtual storage array according to an example embodiment of the present invention. As illustrated in FIG. 9, an IT administrator may provide a name 910 for the virtual array and, as will be described in greater detail below, assign a plurality of physical storage pools for later aggregation and use for creating virtual storage pools. As will be described below with reference to FIGS. 12 and 13A-13C, the IT administrator may add physical storage pools to the virtual storage array by adding networks 950, adding storage ports 960, adding storage pools 970, and by adding storage systems 980.

FIG. 10 is a screen shot of a graphical user interface (GUI) 1000 for adding a storage system to a virtual storage array according to an example embodiment of the present invention. As illustrated in FIG. 10, the GUI 1000 displays a plurality of storage systems $1015_1$-$1015_3$ (1015 generally) that may be managed via the storage management API. The GUI 1000 displays information regarding the available storage systems 1015, such as name 1010, storage system type 1020 (e.g., VNX®, VMAX), and storage system status 1030. An IT administrator may select one or more of the available storage systems 1015 and add them to the virtual storage array.

FIGS. 11A-11C are screen shots of respective graphical user interfaces (GUIs) 1100A, 1100B, 1100C for adding networks, storage ports, and storage pools according to example embodiments of the present invention.

As illustrated in FIG. 11A, the GUI 1100A displays a plurality of networks $1115A_1$-$1115A_N$ (1115A generally) that may be managed via the storage management API. The GUI 1100A displays information regarding the available storage ports 1115A, such as name 1110A and type 1120A. An IT administrator may select one or more of the available networks 1115A and add them to the virtual storage array.

As illustrated in FIG. 11B, the GUI 1100B displays a plurality of storage ports $1115B_1$-$1115B_N$ (1115B generally) that may be managed via the storage management API. The GUI 1100B displays information regarding the available networks 1115B, such as name 1110B, storage system 1120B, type 1140B, and port status 1150B. An IT administrator may select one or more of the available storage ports 1115B and add them to the virtual storage array.

As illustrated in FIG. 11C, the GUI 1100C displays a plurality of storage pools $1115C_1$-$1115C_N$ (1115C generally) that may be managed via the storage management API. The GUI 1100C displays information regarding the available storage pools 1115C, such as name 1110C, storage system 1120C, provisioning type 1130C, drive type 1140C, free space 1150C, and total space 1160C.

It should be understood that a virtual storage array aggregates the management of storage capacity (i.e., pools) and connectivity (i.e., ports). Storage pools and storage ports may be assigned directly to the virtual array (as in FIGS. 11B and 11C) or implicitly via network connectivity (as in FIG. 11A).

Figure 12:
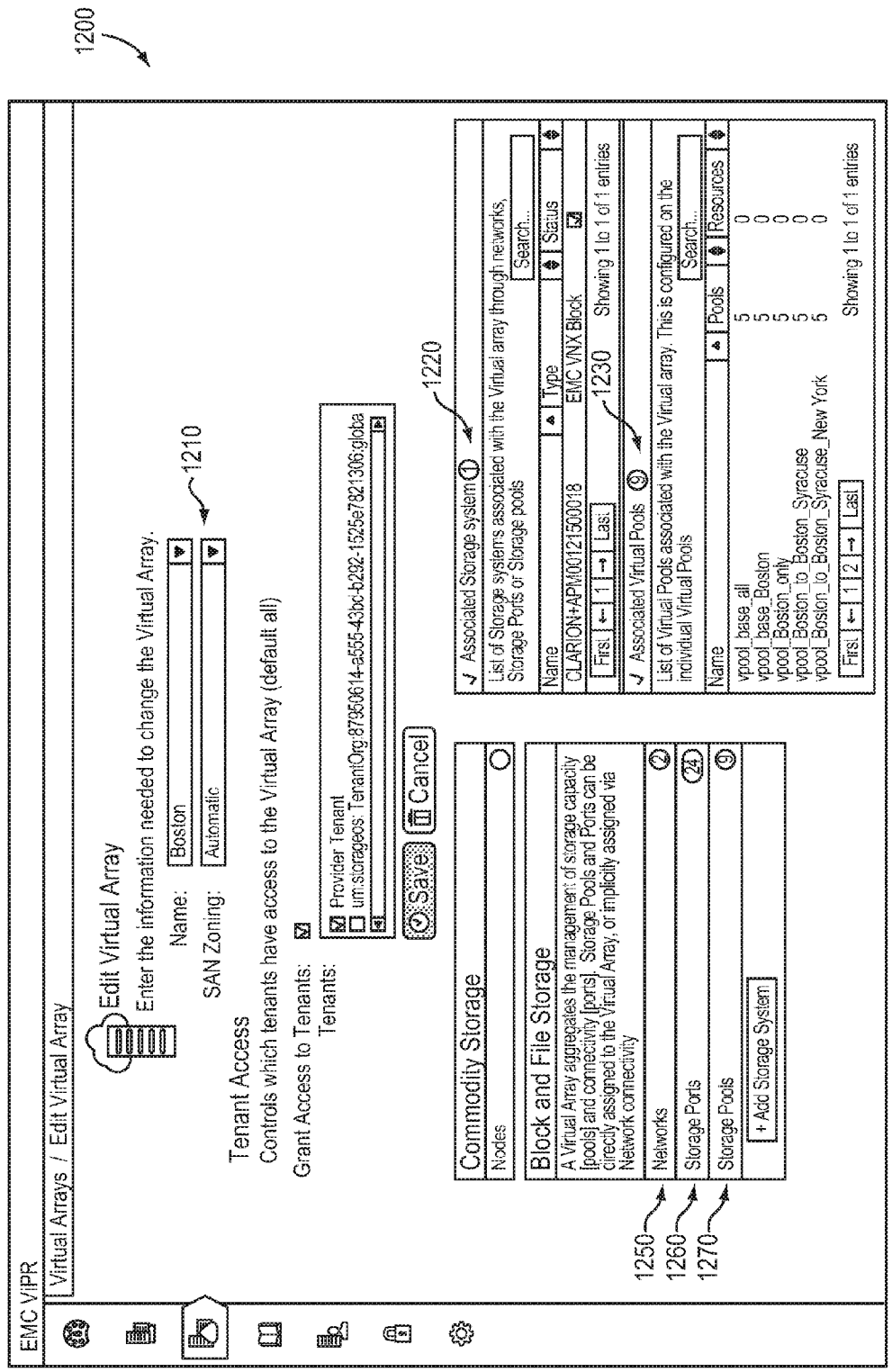
FIG. 12 is a screen shot of a graphical user interface illustrating a virtual storage array including a plurality of networks, a plurality of storage ports, and a plurality of storage pools according to an example embodiment of the present invention.

FIG. 12 is a screen shot of a graphical user interface (GUI) 1200 illustrating a virtual storage array including a plurality of networks 1250, a plurality of storage ports 1260, and a plurality of storage pools 1270 according to an example embodiment of the present invention. As illustrated in FIG. 12, there is one storage system 1220 associated with the virtual storage array and, after creating virtual storage pools, nine virtual storage pools 1230 associated with the virtual storage array. Further, there are two networks 1250, twentyfour storage ports 1260, and nine storage pools 1270 associated with the virtual storage array. These storage capacity (i.e., pools) and connectivity (i.e., ports) resource may be used by an IT administrator in creating virtual storage pools, as described below.

Figure 13:
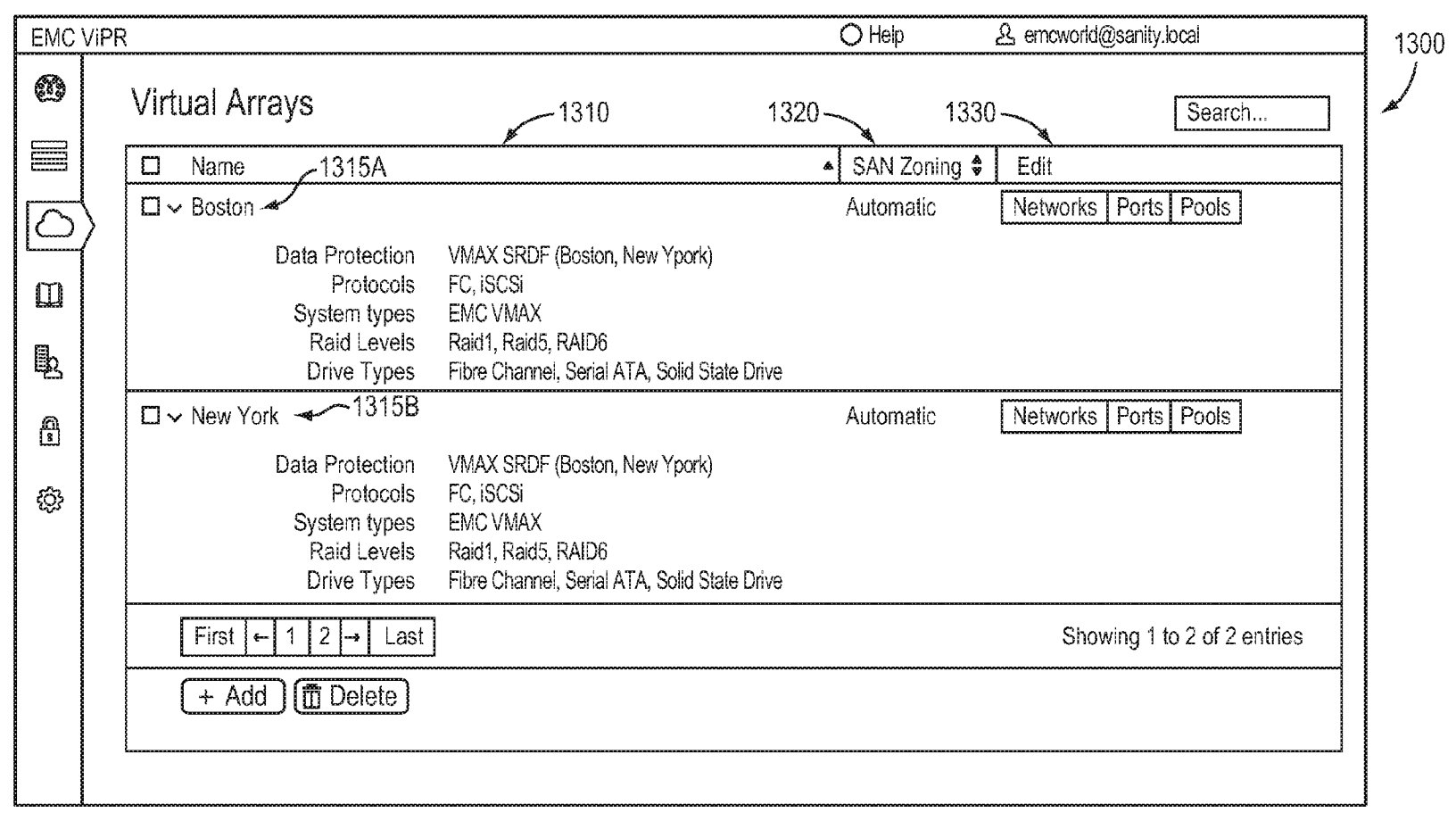

FIG. 13 is a screen shot of a graphical user interface (GUI) 1300 illustrating a plurality of virtual storage arrays according to an example embodiment of the present invention. As illustrated in FIG. 13, there are two virtual arrays available: Boston 1315A and New York 1315B (1315 generally). As illustrated in FIG. 13, each virtual storage array 1315 may have a plurality of attributes, including its data protection available for the virtual storage array and between which virtual storage arrays (e.g., SRDF between Boston and New York), protocols (e.g., fibre channel, iSCSI) supported by the virtual storage array, storage system types comprising the virtual storage array (e.g., VMAX), RAID levels supported by the virtual storage array (e.g., RAID1, RAID5, RAID6), and drive types available on the virtual storage array (i.e., available on the storage systems comprising the virtual storage array) (e.g., fibre channel (FC), serial ATA (SATA), solid state drive (SSD)). Further, as illustrated in FIG. 13, the GUI 1300 may provide information regarding the virtual storage arrays 1315, such as virtual storage array name 1310 (e.g., Boston, New York), the type of SAN zoning support (e.g., automatic or manual) by the virtual storage array 1320, and the ability to edit 1330 the networks, ports, and pools comprising the virtual storage array. It should be understood that the source and target virtual storage arrays would be created such that the source storage system (i.e., SYMMETRIX+000195701573 815A of FIG. 8) is placed in the source virtual storage array (i.e., Boston 1315A) and the target storage system (i.e., SYMMETRIX+000195701505 815B of FIG. 8) is placed in the target virtual storage array (i.e., New York 1315B).

FIG. 14 is a screen shot of a graphical user interface (GUI) 1400 for creating a virtual storage pool for data replication according to an example embodiment of the present invention. In other words, the GUI 1400 of FIG. 14 illustrates inputs for creating a data protection virtual storage pool representing storage that will be used for data protection storage for SRDF. The virtual storage pool may be given a name 1405 (e.g., "DR pool") and a description 1410 (e.g., "Pool for DR Storage for Boston production storage), and a virtual storage array 1415 (e.g., New York) may be selected to determine from which virtual storage array the SRDF-protected resources for the virtual storage pool should come. Further, the storage system type 1420 may be defined, further limiting the type of storage system in the selected virtual storage array that may be used for storage selected for the virtual storage pool.

The storage management API then may determine which physical storage pool(s) in the selected virtual storage array(s) satisfy the provided attributes. In a preferred embodiment, certain attributes are required for creation of a virtual storage pool: protocol, a selection of virtual arrays, volume provisioning type (e.g., thin, thick), and multipathing. Other attributes may function as filters to further refine the resulting physical storage pools that satisfy the attributes: storage system type (e.g., VMAX), RAID level (e.g., RAID0, RAID1, RAID5, RAID6), storage drive type (e.g., fibre channel (FC), serial ATA (SATA), solid state drive (SSD), and storage tiering policy.

As illustrated in FIG. 14, after applying the mandatory attributes and filter attributes to the physical storage pool filtering process described above, a plurality of physical storage pools 1430 are returned. In certain embodiments, pool assignment 1425 from the plurality of physical storage pools 1430 may be done automatically or, as illustrated in FIG. 14, one or more physical storage pools 1430 may be selected for inclusion in the virtual storage pool. It should be understood that each of the returned physical storage pools 1430 satisfies the criteria established by the attributes provided by the IT administrator creating the virtual storage pool. The GUI 1400 provides information regarding each physical storage pool 1430 including its name 1435, the storage system 1440 on which it resides, the provisioning type 1445, the drive types 1450 used in the physical storage pool, the amount of free space 1455 in the physical storage pool, the amount of storage subscribed to in the physical storage pool 1460, and the total space in the physical storage pool 1465.

In other words, example embodiments of the present invention identify the underlying physical storage for a virtual storage pool using a matching framework that implements a cascaded filtering method. In certain embodiments, the framework uses "matchers" deployed in the system per attribute. When a matcher is invoked by the framework, it probes all the physical storage resource to identify storage resources with the characteristics described by the attribute (e.g., based on physical properties or connectivity). In order to identify storage that matches a virtual storage pool definition, a cascaded filtering method is applied on the matchers. A virtual storage pool without any attribute therefore matches a universal set of physical storage/infrastructure and each attribute in a virtual storage pool is a constraint on the universal set of physical storage/infrastructure. Each attribute therefore maps to a subset of the physical storage/infrastructure and a virtual storage pool is an intersection of the physical storage identified by the constraints that results in the storage/infrastructure that provides desired functionality.

FIG. 15 is a screen shot of a graphical user interface (GUI) 1500 for creating a virtual storage pool for provisioning requests that require data protection according to an example embodiment of the present invention. In other words, the GUI 1500 of FIG. 15 illustrates inputs for creating a source virtual storage pool representing storage that will be used for storage provisioning and, as described in greater detail below, with data protection. The virtual storage pool may be given a name 1505 (e.g., "Block with Protection") and a description 1510 (e.g., "Pool for new provisioning requests that require DR protection to New York"), and a virtual storage array 1515 (e.g., Boston) may be selected to determine from which virtual storage array the resources for the virtual storage pool should come. Further, the supported storage protocols 1520 and storage system type 1525 may be defined, further limiting the type of storage system in the selected virtual storage array that may be used for storage for the virtual storage pool.

The IT administrator also may define a type of data protection to be used with storage provisioned out of the virtual storage pool by selecting a type of protection system 1530 (e.g., SRDF), a copy mode 1535 (e.g., synchronous), and a target virtual storage array (e.g., New York) and target virtual storage pool (e.g., DR Pool created in FIG. 15) 1540.

The storage management API then may determine which physical storage pool(s) in the selected virtual storage array(s) satisfy the provided attributes. In a preferred embodiment, certain attributes are required for creation of a virtual storage pool: protocol, a selection of virtual arrays, volume provisioning type (e.g., thin, thick), and multipathing. Other attributes may function as filters to further refine the resulting physical storage pools that satisfy the attributes: storage system type (e.g., VMAX), RAID level (e.g., RAID0, RAID1, RAID5, RAID6), storage drive type (e.g., fibre channel (FC), serial ATA (SATA), solid state drive (SSD), and storage tiering policy.

As illustrated in FIG. 15, after applying the mandatory attributes and filter attributes to the physical storage pool filtering process described above, a plurality of physical storage pools 1545 are returned. In certain embodiments, pool assignment 1550 from the plurality of physical storage pools 1545 may be done automatically as illustrated in FIG. 15 or one or more physical storage pools 1545 may be selected for inclusion in the virtual storage pool. It should be understood that each of the returned physical storage pools 1545 satisfies the criteria established by the attributes provided by the IT administrator creating the virtual storage pool. The GUI 1500 provides information regarding each physical storage pool 1545 including its name 1565, the storage system 1570 on which it resides, the provisioning type 1575, the drive types 1580 used in the physical storage pool, the amount of free space 1585 in the physical storage pool, the amount of storage subscribed to in the physical storage pool 1590, and the total space in the physical storage pool 1595.

Figure 16:
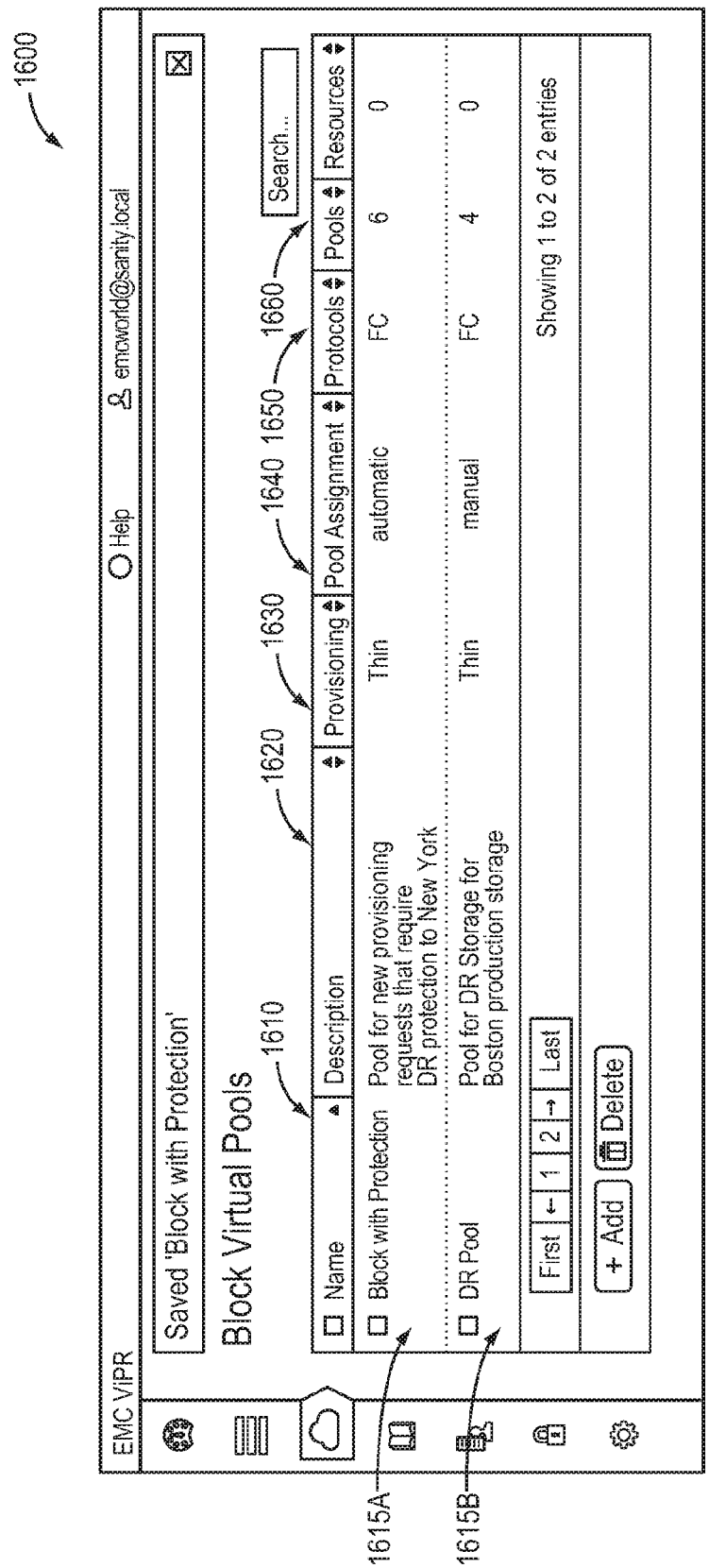
FIG. 16 is a screen shot of a graphical user interface illustrating the virtual storage pools created in FIGS. 15 and 16 according to an example embodiment of the present invention.

FIG. 16 is a screen shot of a graphical user interface (GUI) 1600 illustrating the virtual storage pools created in FIGS. 14 and 15 (e.g., "Block with Protection" 1615A for creating volumes requiring data protection and "DR Pool" 1615B for data protection) (1615 generally) according to an example embodiment of the present invention. As illustrated in FIG. 16, the GUI 1600 displays information regarding the virtual storage pools 1615 provided when creating the virtual storage pool (i.e., in FIGS. 14 and 15) including virtual storage pool name 1610 provided, virtual storage pool description 1620, the provisioning type 1630, the pool assignment (e.g., automatic, manual) 1640, the supported protocols 1650, and the number of matched physical storage pools with similar characteristics defined in the virtual storage pool 1660.

FIG. 16 may be described in conjunction with FIGS. 7A-7B which are flow diagrams illustrating methods for aggregating storage resources from physical storage pools into a virtual storage pool according to respective example embodiments of the present invention. As illustrated in FIG. 7A, and as shown above in FIGS. 14-16, a virtual storage pool may be created by selecting a plurality of storage resources from the plurality of physical storage pools (750) and aggregating the plurality of storage resources from the plurality of physical storage pools into a virtual storage pool (765). As illustrated in FIG. 7B, the storage resource may be selected by receiving a selection of a plurality of virtual storage pool attributes (755) and filtering over the plurality of storage resources according to the plurality of virtual storage pool attributes (760). The filtered storage resources then may be aggregated into the virtual storage pool. It should be noted that a virtual storage pool may be in multiple virtual storage arrays.

In example embodiments of the present invention there are two ways to create virtual storage pools. For example, the system may receive a selection of virtual storage pool attributes and filter over the physical storage pools according to the attributes. In certain embodiments, a manual (i.e., static) process for aggregation selects physical storage pools from the list of filtered physical storage pools with the selected physical storage pools being aggregated into the virtual storage pool. In other embodiments, a automatic (i.e., dynamic) process for aggregation aggregated the filtered physical storage pools into a virtual storage pool and continues to aggregate newly discovered pools filtered according to the attributes into the virtual storage pool.

It should be understood that, although FIG. 16 illustrated creation of virtual storage pools for block storage, virtual storage pools may be created for other storage types (e.g., file and object). Further, according to the type of storage for which the virtual storage pool is being created, different attributes may be needed. For example, for file storage, file virtual storage pools may have attributes including name provided, virtual storage pool description, virtual arrays, provisioning type (i.e., thin or thick), protocols (e.g., NFS, CIFS, etc.), system type (e.g., EMC® Isilon®, EMC VNX, NetApp), and data protection (e.g., number of snapshots allowed).

Figure 17:
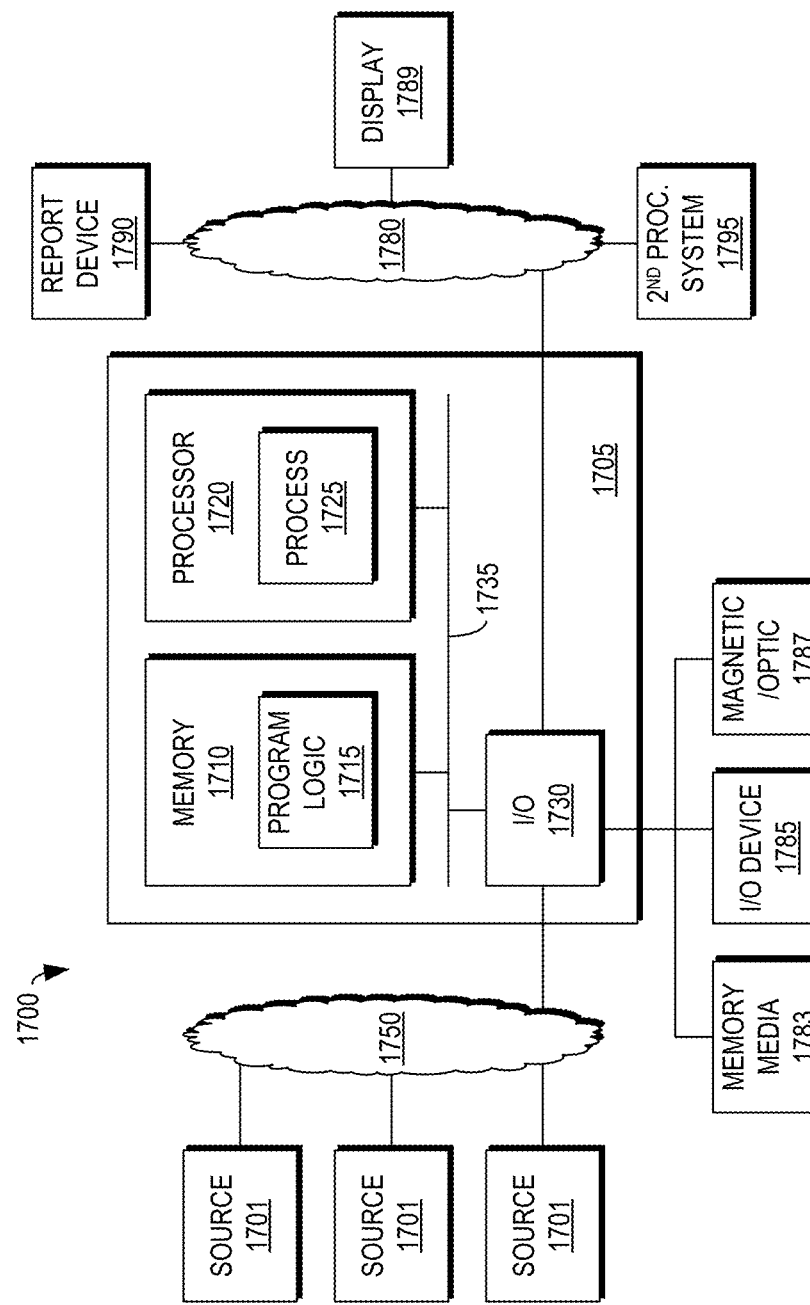
FIG. 17 is a block diagram of an apparatus according to an example embodiment the present invention.

FIG. 17 is a block diagram of an apparatus 1705 according to an example embodiment of the present invention. The apparatus 1705 may be part of a system 1700 and includes memory 1710 storing program logic 1715, a processor 1720 for executing a process 1725, and a communications I/O interface 1730, connected via a bus 1735.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 17, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 18:
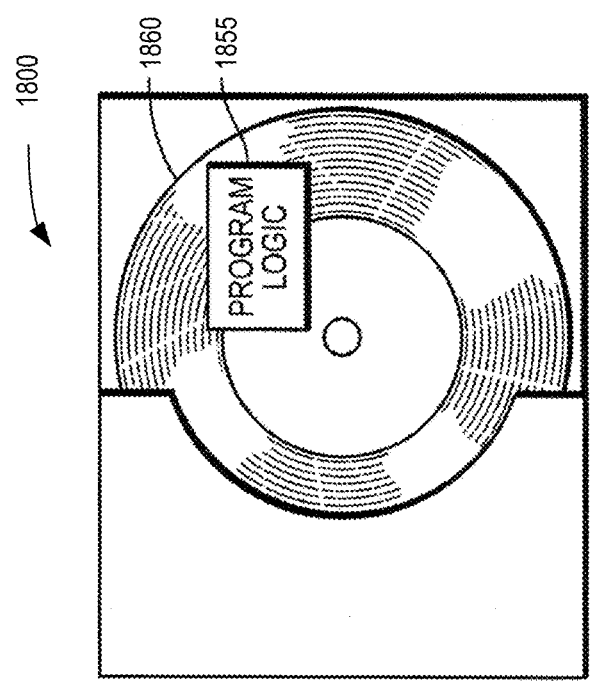
FIG. 18 is a block diagram of a computer program product including program logic, encoded on a computer-readable medium in computer-executable code configured for carrying out the methods of the invention, according to an example embodiment of the present invention.

FIG. 18 is a block diagram of a computer program product 1800 including program logic 1855, encoded on a computer-readable medium 1860 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   selecting a plurality of physical storage pools, each physical storage pool comprising a set of pools for storage, from one or more physical storage arrays in a storage area network (SAN);
   selecting a plurality of ports from the physical storage arrays as targets in the SAN over which the physical storage pools are accessible;
   aggregating the physical storage pools and ports from the physical storage arrays into a virtual storage array;
   adding dynamically a new storage resource including storage pools and/or ports implicitly to the virtual storage array based on a physical resource being explicitly associated with the virtual storage array;
   wherein selecting a plurality of ports in the storage environment comprises selecting a network in the storage environment; and
   wherein aggregating the physical storage pools and ports into a virtual storage array comprises adding the network to the virtual storage array, thereby implicitly adding physical storage pools and ports comprising the network to the virtual storage array.

2. The method of claim 1
   wherein each physical storage pool of the plurality of physical storage pools comprises a set of pools of storage on physical storage arrays that each may exist in one or more networks;
   wherein the plurality of ports may exist in one or more networks; and
   wherein aggregating the physical storage pools and the physical storage ports into a virtual storage array comprises aggregating a first physical storage pool from a first network and a second physical storage pool from a second network into the virtual storage array such that the virtual storage array may be in one or more networks.

3. The method of claim 2 wherein the each of the respective physical storage pools and each of the respective ports may be aggregated into a plurality of virtual storage arrays.

4. The method of claim 1
   wherein selecting a plurality of ports in the storage environment comprises selecting the plurality of ports and, by association, a plurality of physical storage pools associated with the plurality of ports; and
   wherein aggregating the physical storage pools and physical storage ports into a virtual storage array comprises adding the selected plurality of ports to the virtual storage array, thereby implicitly adding physical storage pools accessible over the ports to the virtual storage array.

5. The method of claim 1
   wherein selecting a plurality of ports in the storage environment comprises selecting the plurality of ports and, by association, a plurality of physical storage pools associated with the plurality of ports; and
   wherein aggregating the physical storage pools and ports into a virtual storage array comprises adding selected physical storage pools of the plurality of physical storage pools associated with the selected ports to the virtual storage array.

6. The method of claim 1 further comprising:
   selecting a plurality of storage resources from the plurality of physical storage pools; and
   aggregating the plurality of storage resources from the plurality of physical storage pools into a virtual storage pool.

7. The method of claim 6
   wherein selecting a plurality of storage resources from the plurality of physical storage pools comprises:
   receiving a selection of a plurality of virtual storage pool attributes; and
   filtering over the plurality of storage resources according to the plurality of virtual storage pool attributes; and
   wherein aggregating the plurality of storage resources from the plurality of physical storage pools into a virtual storage pool comprises aggregating the filtered storage resources into the virtual storage pool.

8. The method of claim 7 wherein the virtual storage pool defines mandatory attributes and filter attributes.

9. The method of claim 8 wherein the mandatory attributes are selected from a group of primary storage attributes consisting of: protocol, virtual arrays, volume provisioning, and multipathing.

10. The method of claim 8 wherein the filter attributes are selected from a group of primary storage attributes consisting of: storage system type, RAID level, storage drive type, and storage tiering policy.

11. The method of claim 8 wherein the filter attributes are selected from a group of protection attributes consisting of: snapshots, local mirror, remote replication, and high availability.

12. A system comprising:
   one or more physical storage arrays in a storage area network (SAN) having one or more ports and one or more physical storage pools each comprising a set of pools of storage; and
   computer executable logic configured to enable one or more processors of the system to perform operations of:
   selecting a plurality of physical storage pools from the one or more physical storage arrays in the SAN;
   selecting a plurality of ports from the physical storage arrays as targets in the SAN over which the physical storage pools are accessible;
   aggregating the physical storage pools and ports from the physical storage arrays into a virtual storage array;
   adding dynamically a new storage resource including storage pools and/or ports implicitly to the virtual storage array based on a physical resource being explicitly associated with the virtual storage array;
   wherein selecting a plurality of ports in the storage environment comprises selecting a network in the storage environment; and
   wherein aggregating the physical storage pools and ports into a virtual storage array comprises adding the network to the virtual storage array, thereby implicitly adding physical storage pools and ports comprising the network to the virtual storage array.

13. The system of claim 12
   wherein each physical storage pool of the plurality of physical storage pools comprises a set of pools of storage on physical storage arrays that each may exist in one or more networks;
   wherein the plurality of ports may exist in one or more networks; and
   wherein aggregating the physical storage pools and the physical storage ports into a virtual storage array comprises aggregating a first physical storage pool from a first network and a second physical storage pool from a second network into the virtual storage array such that the virtual storage array may be in one or more networks.

14. The system of claim 13 wherein the each of the respective physical storage pools and each of the respective ports may be aggregated into a plurality of virtual storage arrays.

15. The system of claim 12
wherein selecting a plurality of ports in the storage environment comprises selecting the plurality of ports and, by association, a plurality of physical storage pools associated with the plurality of ports; and
wherein aggregating the physical storage pools and physical storage ports into a virtual storage array comprises adding the selected plurality of ports to the virtual storage array, thereby implicitly adding physical storage pools accessible over the ports to the virtual storage array.

16. The system of claim 12
wherein selecting a plurality of ports in the storage environment comprises selecting the plurality of ports and, by association, a plurality of physical storage pools associated with the plurality of ports; and
wherein aggregating the physical storage pools and ports into a virtual storage array comprises adding selected physical storage pools of the plurality of physical storage pools associated with the selected ports to the virtual storage array.

17. The system of claim 12 wherein the computer executable logic is further configured to enable one or more processors of the system to perform operations of:
selecting a plurality of storage resources from the plurality of physical storage pools; and
aggregating the plurality of storage resources from the plurality of physical storage pools into a virtual storage pool.

18. The system of claim 17
wherein selecting a plurality of storage resources from the plurality of physical storage pools comprises:
receiving a selection of a plurality of virtual storage pool attributes; and
filtering over the plurality of storage resources according to the plurality of virtual storage pool attributes; and
wherein aggregating the plurality of storage resources from the plurality of physical storage pools into a virtual storage pool comprises aggregating the filtered storage resources into the virtual storage pool.

19. The system of claim 18 wherein the virtual storage pool defines mandatory attributes and filter attributes.

20. The system of claim 19 wherein the mandatory attributes are selected from a group of primary storage attributes consisting of: protocol, virtual arrays, volume provisioning, and multipathing.

21. The system of claim 19 wherein the filter attributes are selected from a group of primary storage attributes consisting of: storage system type, RAID level, storage drive type, and storage tiering policy.

22. The system of claim 19 wherein the filter attributes are selected from a group of protection attributes consisting of: snapshots, local mirror, remote replication, and high availability.

23. A computer program product including a non-transitory computer readable storage medium have computer program code encoded thereon that, when executed on one or more processors of a system, causes the system to manage a plurality of storage providers to create a virtual storage array, the computer program code comprising:
computer program code for selecting a plurality of physical storage pools, each physical storage pool comprising a set of pools of storage, from one or more physical storage arrays in a storage area network (SAN);
computer program code for selecting a plurality of ports from the physical storage arrays as targets in the SAN over which the physical storage pools are accessible;
computer program code for aggregating the physical storage pools and ports from the physical storage arrays into a virtual storage array;
computer program code for adding dynamically a new resource including storage pools and/or ports implicitly to the virtual storage array based on a physical resource being explicitly associated with the virtual storage array;
wherein selecting a plurality of ports in the storage environment comprises selecting a network in the storage environments; and
wherein aggregating the physical storage pools and ports into a virtual storage array comprises adding the network to the virtual storage array, thereby implicitly adding physical storage pools and ports comprising the network to the virtual storage array.

24. The computer program product of claim 23 further comprising:
computer program code for selecting a plurality of storage resources from the plurality of physical storage pools; and
computer program code for aggregating the plurality of storage resources from the plurality of physical storage pools into a virtual storage pool.

* * * * *